United States Patent
Schneegas et al.

(10) Patent No.: US 11,971,123 B1
(45) Date of Patent: Apr. 30, 2024

(54) INTERCONNECTING SPRING CLAMP HOSE MARKERS

(71) Applicant: Fieldpiece Instruments, Inc., Orange, CA (US)

(72) Inventors: Nicole Antoinette Schneegas, Orange, CA (US); Jason Corbett Gilley, Orange, CA (US); Henry J. Kuo, Orange, CA (US)

(73) Assignee: Fieldpiece Instruments, Inc., Orange, CA (US)

( * ) Notice: Subject to any disclaimer, the term of this patent is extended or adjusted under 35 U.S.C. 154(b) by 0 days.

(21) Appl. No.: 17/991,035

(22) Filed: Nov. 21, 2022

(51) Int. Cl.
*F16G 11/00* (2006.01)
*F16L 33/03* (2006.01)

(52) U.S. Cl.
CPC .............. *F16L 33/03* (2013.01); *Y10T 24/14* (2015.01)

(58) Field of Classification Search
CPC ....... F16L 33/03; F16L 3/1025; F16L 3/1041; F16L 3/1091; F16L 55/17; F16L 37/252; Y10T 24/14; Y10T 24/44034; Y10T 24/142
See application file for complete search history.

(56) References Cited

U.S. PATENT DOCUMENTS

| | | | | |
|---|---|---|---|---|
| 164,028 | A * | 6/1875 | Peake | F16L 55/17 138/99 |
| 4,527,490 | A * | 7/1985 | Tipton | A47B 57/265 108/108 |
| 4,612,680 | A * | 9/1986 | Daiguji | E01D 19/16 174/92 |
| 5,303,645 | A * | 4/1994 | Meacham | A47B 57/545 108/180 |
| 7,992,730 | B2 * | 8/2011 | Huang | A47B 57/265 211/187 |
| D900,983 | S * | 11/2020 | Leung | D23/266 |
| 2001/0013156 | A1 * | 8/2001 | LaCoy | F16L 3/1025 24/16 R |

* cited by examiner

*Primary Examiner* — Jonathan Malikasim
*Assistant Examiner* — Michael S Lee
(74) *Attorney, Agent, or Firm* — Paul J. Backofen, Esq.

(57) ABSTRACT

A spring clamp marker assembly is composed of interconnecting spring clamp hose markers that provide a positive and easily changeable means for marking hoses used to maintain HVAC equipment and for any other suitable application. The interconnecting spring clamp hose markers may also be used with power cables or other linear items with a generally circular cross section.

4 Claims, 5 Drawing Sheets

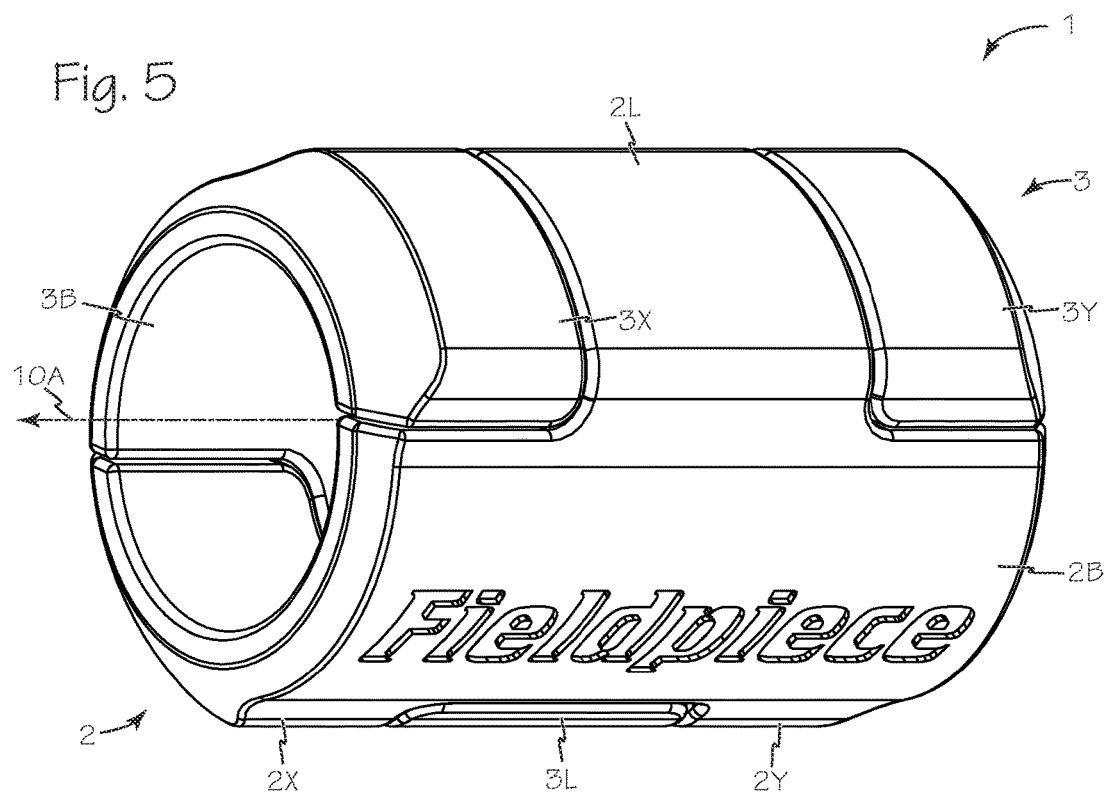
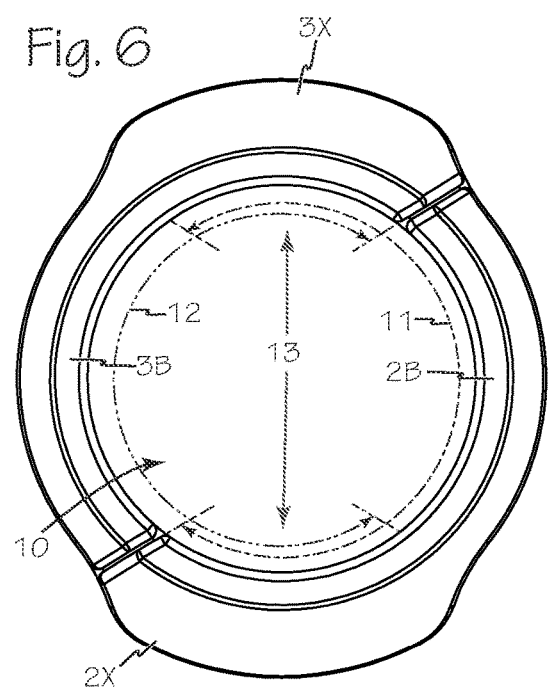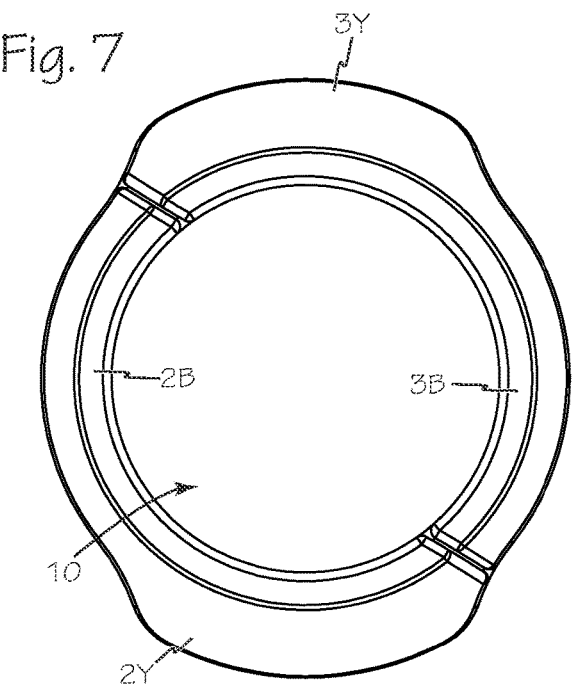

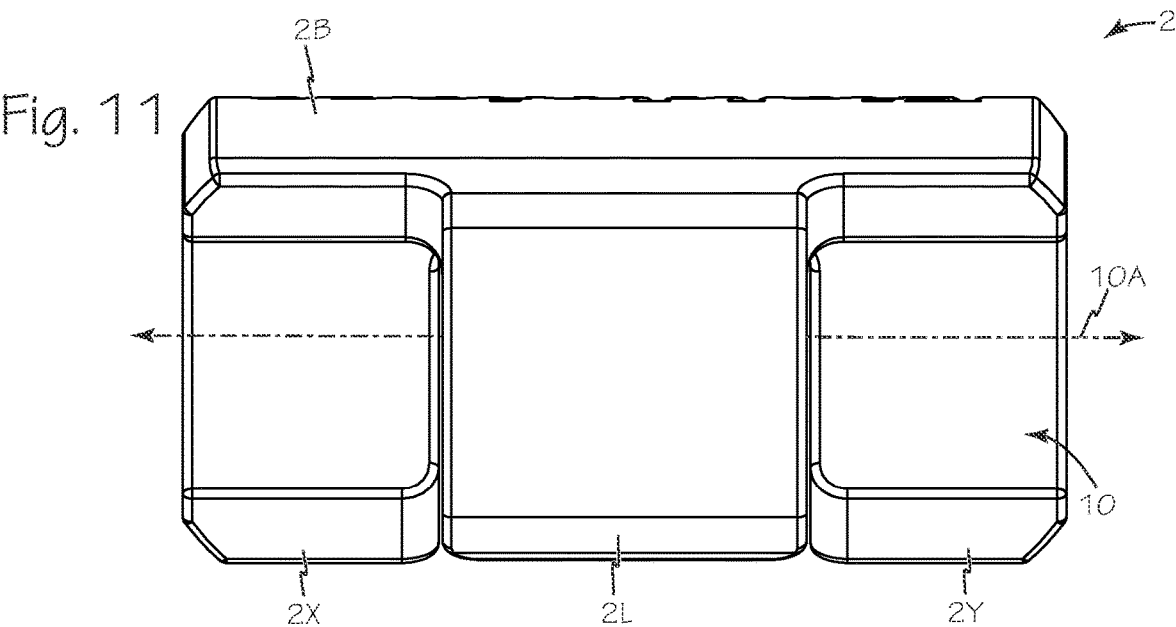
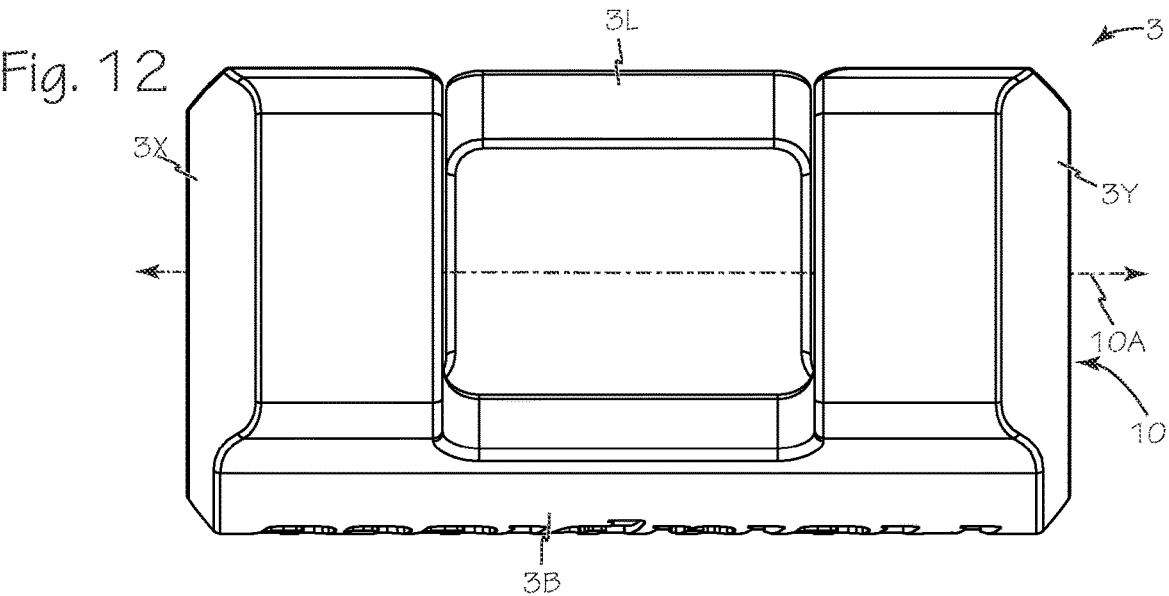

INTERCONNECTING SPRING CLAMP HOSE MARKERS

FIELD OF THE INVENTIONS

The inventions described below relate to the field of heating, ventilation and air conditioning (HVAC) equipment.

BACKGROUND OF THE INVENTIONS

Servicing heating, ventilation and air conditioning equipment often requires the use of hoses to connect to the HVAC equipment. It is often difficult to distinguish between similar hoses on a maintenance job when they start showing wear from use.

SUMMARY

The devices and methods described below provide a spring clamp marker assembly of interconnecting spring clamp hose markers that provide a positive and easily changeable means for marking hoses used to maintain HVAC equipment and for any other suitable application. The interconnecting spring clamp hose markers may also be used with power cables or other linear items with a generally circular cross section.

BRIEF DESCRIPTION OF THE DRAWINGS

FIG. 5 is a top right perspective view of the pair of interconnecting spring clamp hose markers of FIG. 1.

FIG. 6 is a right side plan view of the pair of interconnecting spring clamp hose markers of FIG. 1.

FIG. 7 is a left side plan view of the pair of interconnecting spring clamp hose markers of FIG. 1.

FIG. 11 is a bottom plan view of the first interconnecting spring clamp hose marker of FIG. 3.

FIG. 12 is a top plan view of a second interconnecting spring clamp hose marker of FIG. 1 oriented to interconnect with the first interconnecting spring clamp hose marker of FIG. 11.

DETAILED DESCRIPTION OF THE INVENTIONS

Figure 1:
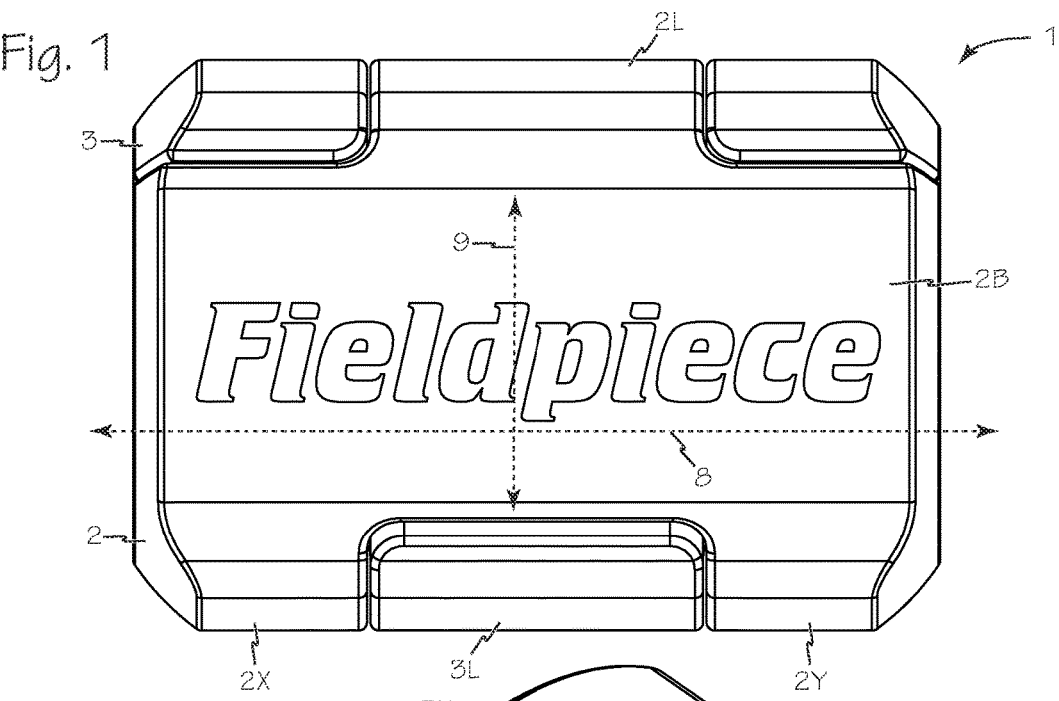
FIG. 1 is a front plan view of a pair of interconnecting spring clamp hose markers.
Figure 2:
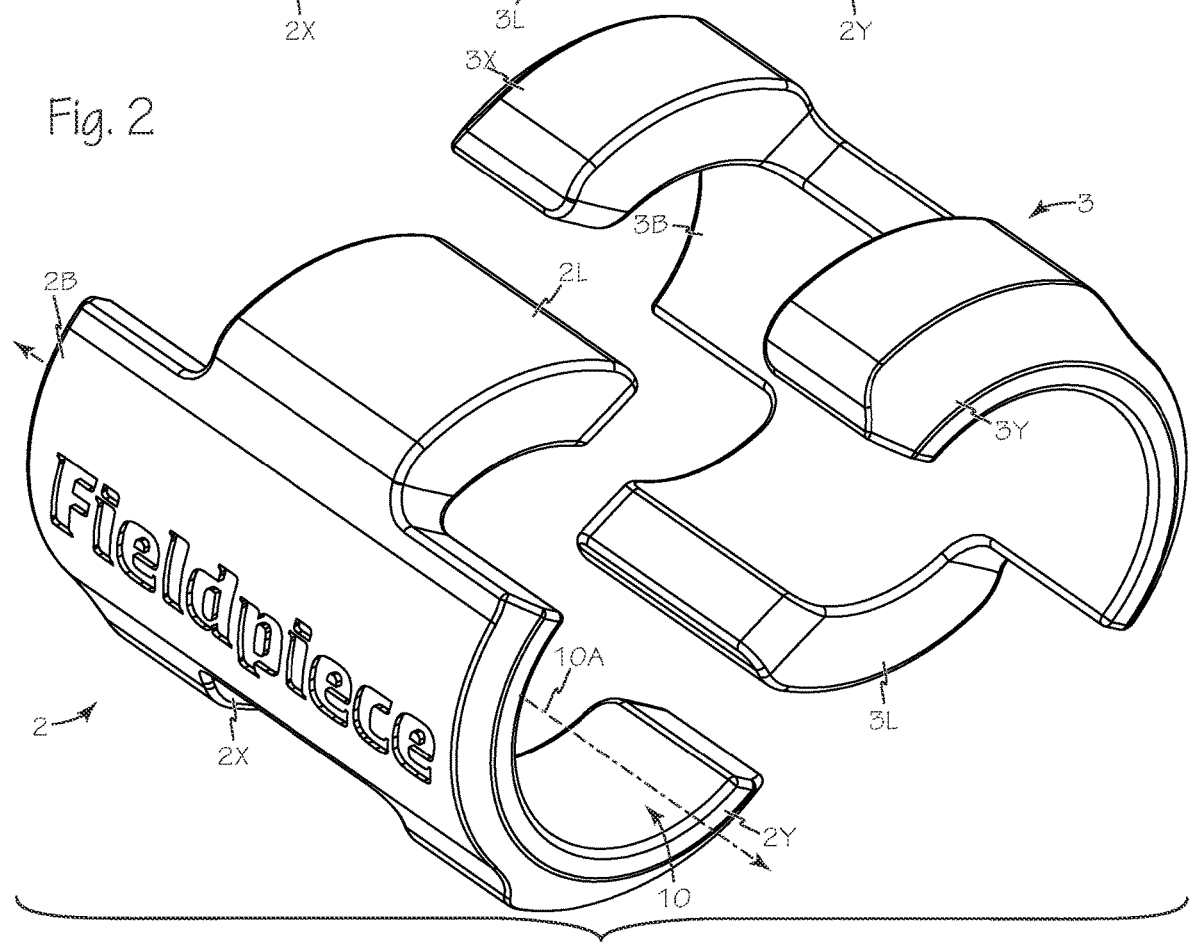
FIG. 2 is a top, left, front perspective of a separated pair of interconnecting spring clamp hose markers.
Figure 3:
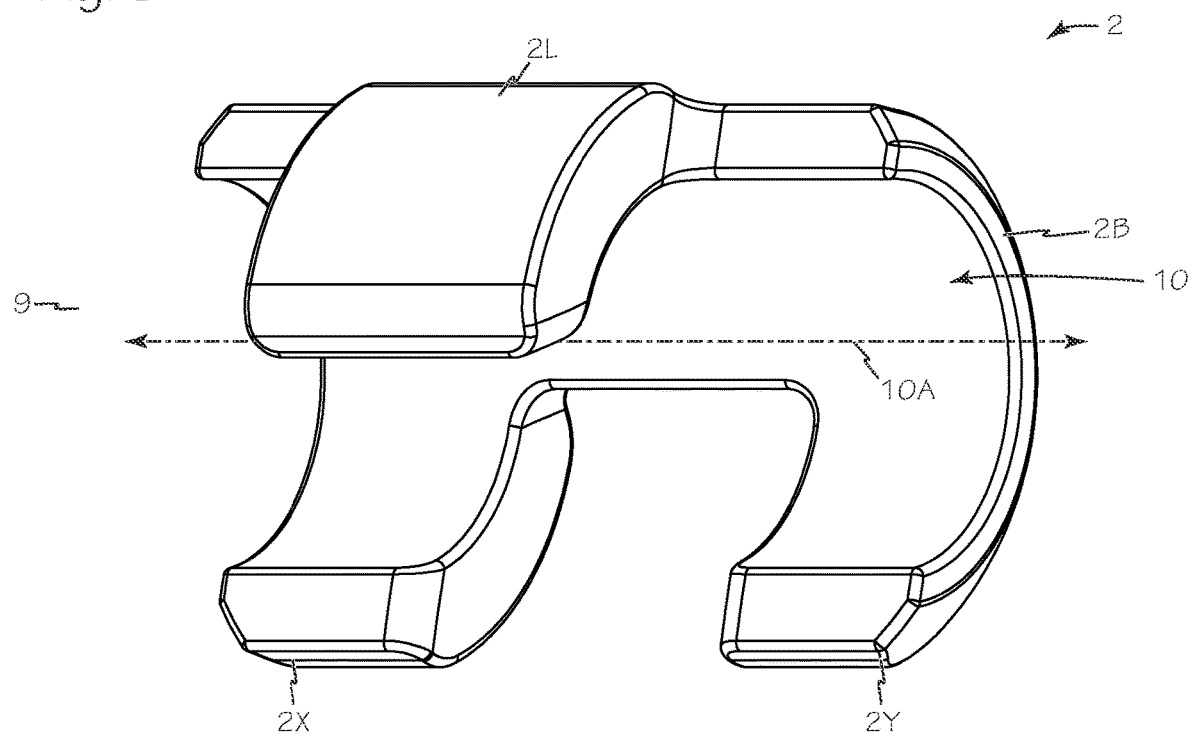
FIG. 3 is a bottom, right, front perspective view of a first interconnecting spring clamp hose marker of the pair of interconnecting spring clamp hose markers of FIG. 1.

FIGS. 1, 5, 6, 7, 8, 9 and 10 illustrate a pair of interconnecting spring clamp hose markers forming a hose marker assembly 1. FIG. 2 illustrates a first interconnecting spring clamp hose marker 2 and a second interconnecting spring clamp hose marker 3 separated and oriented to engage a hose, wire, rod or other linear element with a circular cross section. Each of the first and second interconnecting spring clamp hose markers 2 and 3 are identical in size and shape to simplify manufacturing, use, inventory and sales. Each interconnecting spring clamp hose marker such as markers 2 and 3 have a generally rectangular body such as body 2B, or 3B, and two small fingers such as small fingers 2X and 2Y, 3X and 3Y, and a single large finger opposing the small fingers such as large finger 2L or 3L respectively. The generally rectangular body of an interconnecting spring clamp hose marker has a long axis such as long axis 8 and a perpendicular short axis 9 as illustrated in FIG. 1 with respect to interconnecting spring clamp hose marker 2. The large finger and the small fingers of each spring clamp hose marker extend from the generally rectangular body parallel to the short axis of the body such as short axis 9.

Referring now to FIGS. 2, 3, 4, 11 and 12, each interconnecting spring clamp hose marker such as first interconnecting spring clamp hose marker 2 and a second interconnecting spring clamp hose marker 3 are configured with the body 2B and the two small fingers 2X and 2Y and the single large finger 2L opposing the small fingers of the interconnecting spring clamp hose marker 2 to define a bore 10 with a bore axis 10A. Bore axis 10A is generally parallel to long axis 8 of body 2B. The large finger 2L of the first interconnecting spring clamp hose marker 2 is sized to fit between small fingers 3X and 3Y and contact the body 3B of the second interconnecting spring clamp hose marker 3 when the first and second interconnecting spring clamp hose markers are engaged to form hose marker assembly 1. Similarly, the large finger 3L of the second interconnecting spring clamp hose marker 3 is sized to fit between small fingers 2X and 2Y and contact the body 2B of the first interconnecting spring clamp hose marker 2.

Figure 4:
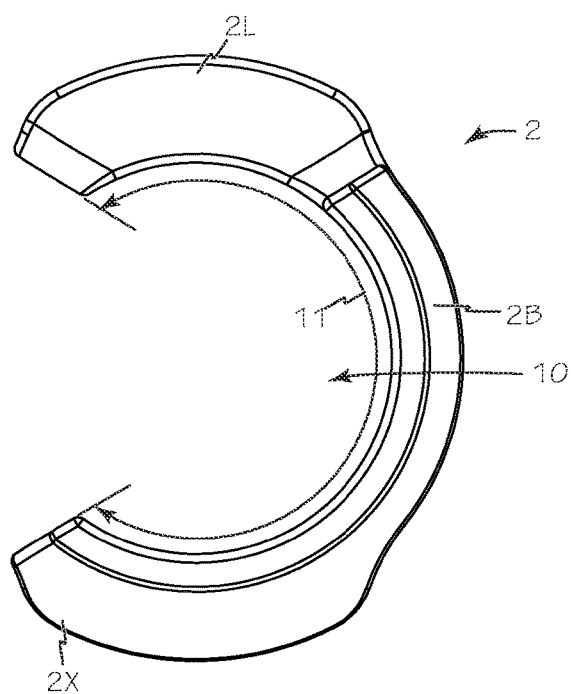
FIG. 4 is a right side plan view of the first interconnecting spring clamp hose marker of FIG. 3.
Figure 8:
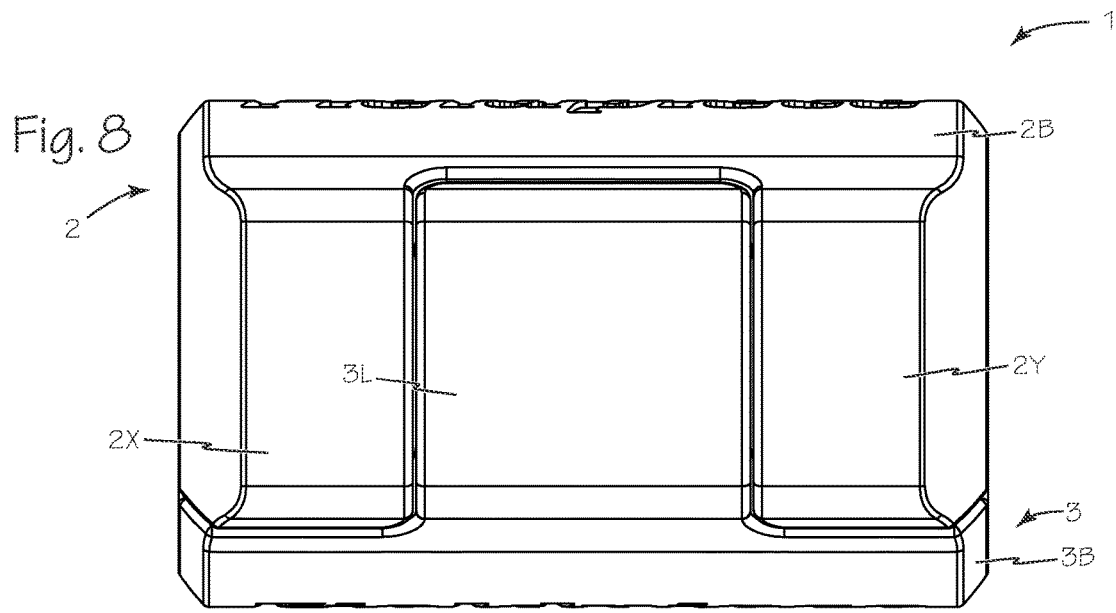
FIG. 8 is a bottom plan view of the pair of interconnecting spring clamp hose markers of FIG. 1.

Referring now to FIG. 4, The body 2B and the two small fingers 2X and 2Y and the single large finger 2L of first interconnecting spring clamp hose marker 2 define bore 10 which accommodates and engages the hose, cable, rod or other element to which the marker assembly 1 is applied. The body and fingers of each spring clamp hose marker create an engagement zone 11 which surrounds something more than 180°, generally 181°-250° of bore 10 and consequently 181°-250° of the circumference of the hose to which the marker assembly is applied. The currently preferred configuration has the body and fingers of each spring clamp hose marker surround 2500 of bore 10. Thus, the engagement zone 11 of the first interconnecting hose clamp marker is 250° and the engagement zone 12 of the second interconnecting hose clamp marker is 2500 creating two overlap zones of 70° such as overlap zones 13. Similarly second interconnecting hose clamp marker 3 has an engagement zone 12 which overlaps engagement zone 11 to form overlap zones 13 when the first interconnecting hose clamp marker 2 and second interconnecting hose clamp marker 3 are interconnected to form hose clamp assembly 1 to engage a hose, cable, wire, rod or other linear element as illustrated in FIG. 6.

Figure 9:
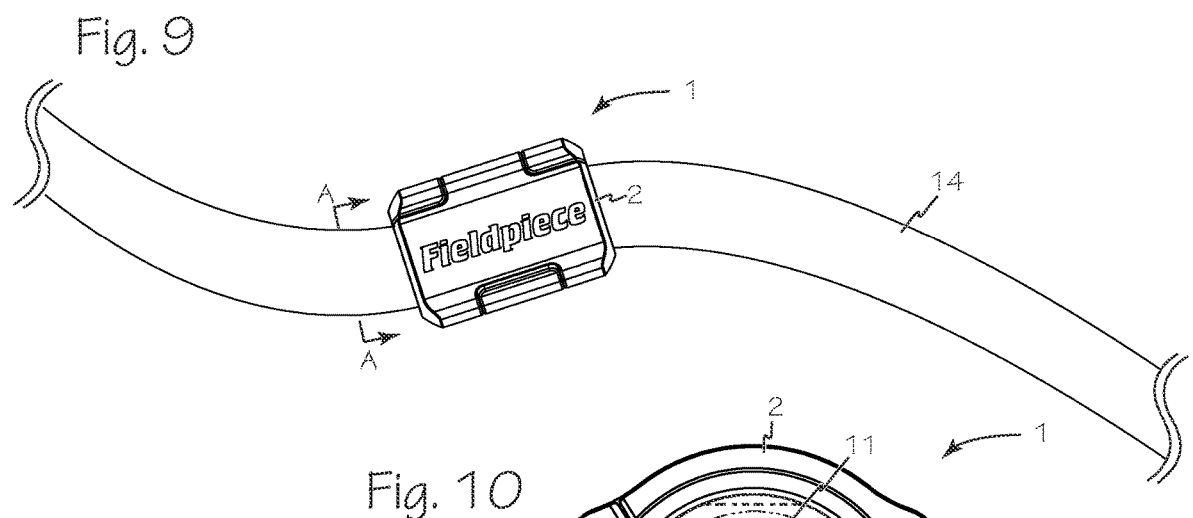
FIG. 9 is an illustration of the pair of interconnecting spring clamp hose markers of FIG. 1 secured to a hose.
Figure 10:
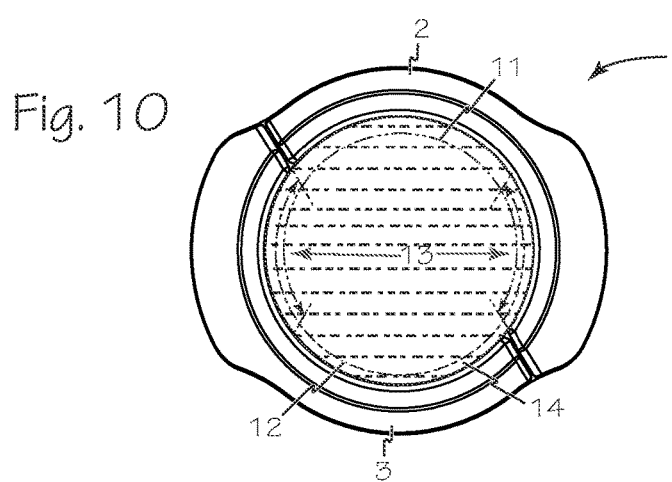
FIG. 10 is a cross section view of the hose marker assembly and hose of FIG. 9 taken along A-A.

In use as illustrated in FIGS. 9 and 10, hose marker assembly 1 is applied to a suitable linear element such as hose 14. Engagement zones 11 and 12 fully encircle hose 14 and overlap zones 13 keep the first and second interconnecting hose clamp marker interconnected and engaged when the hose flexes and moves.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A marker assembly for a hose having a circumference comprising:
    a first spring clamp having a single large spring arm opposing a pair of small spring arms across a bore, the first spring clamp engaging the hose with the three spring arms securing the hose in the bore;
    a second spring clamp having a single large spring arm opposing a pair of small spring arms across a bore, the second spring clamp engaging the hose with the three spring arms securing the hose in the bore;
    wherein the second spring clamp interconnects to the first spring clamp with the single large spring arm of the first spring clamp oriented between the pair of small spring arms of the second spring clamp and with the single large spring arm of the second spring clamp oriented between the pair of small spring arms of the first spring clamp.

2. The marker assembly of claim 1 wherein the first spring clamp comprises a first engagement zone and the second spring clamp comprises a second engagement zone and the first engagement zone and the second engagement zone overlap forming two overlap zones.

3. The marker assembly of claim 2 wherein the first engagement zone and the second engagement zone engages between 181° and 250° of the circumference of the hose.

4. The marker assembly of claim 2 wherein the first engagement zone and the second engagement zone each engage 250° of the circumference of the hose and form an overlap zone engaging 70° of the circumference of the hose.

* * * * *